United States Patent
Lin et al.

(10) Patent No.: US 11,417,063 B2
(45) Date of Patent: Aug. 16, 2022

(54) DETERMINING A THREE-DIMENSIONAL REPRESENTATION OF A SCENE

(71) Applicant: NVIDIA Corporation, Santa Clara, CA (US)

(72) Inventors: Yunzhi Lin, Marietta, GA (US); Jonathan Tremblay, Redmond, WA (US); Stephen Walter Tyree, St. Louis, MO (US); Stanley Thomas Birchfield, Sammamish, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/181,946

(22) Filed: Feb. 22, 2021

(65) Prior Publication Data

US 2022/0068024 A1 Mar. 3, 2022

Related U.S. Application Data

(60) Provisional application No. 63/073,307, filed on Sep. 1, 2020.

(51) Int. Cl.
| | |
|---|---|
| *G06T 19/00* | (2011.01) |
| *G06T 7/73* | (2017.01) |
| *G06T 7/55* | (2017.01) |
| *G06T 17/10* | (2006.01) |
| *G06T 15/10* | (2011.01) |

(52) U.S. Cl.
CPC ............. *G06T 19/003* (2013.01); *G06T 7/55* (2017.01); *G06T 7/75* (2017.01); *G06T 15/10* (2013.01); *G06T 17/10* (2013.01)

(58) Field of Classification Search
CPC ........... G06T 19/003; G06T 7/55; G06T 7/75; G06T 17/10; G06T 15/10
See application file for complete search history.

(56) References Cited

U.S. PATENT DOCUMENTS

| 10,937,237 | B1 * | 3/2021 | Kim | G06N 3/0472 |
|---|---|---|---|---|
| 2012/0196679 | A1 * | 8/2012 | Newcombe | G06K 9/00664 |
| | | | | 463/36 |
| 2014/0192050 | A1 * | 7/2014 | Qiu | G06K 9/00214 |
| | | | | 345/420 |
| 2016/0253807 | A1 * | 9/2016 | Jones | G06K 9/00221 |
| | | | | 382/154 |
| 2016/0311115 | A1 * | 10/2016 | Hill | B25J 9/1664 |
| 2017/0186169 | A1 * | 6/2017 | Viswanath | G06K 9/4604 |

(Continued)

OTHER PUBLICATIONS

Gu et al., "Cascade Cost Volume for High-Resolution Multi-View Stereo and Stereo Matching," IEEE Conference on Computer Vision and Pattern Recognition, 2020, 15 pages, retrieved from https://www.semanticscholar.org/paper/Cascade-Cost-Volume-for-High-Resolution-Multi-View-Gu-Fan/c0a9fcd7644d843fa9591348e5696d5f950a90f.

(Continued)

*Primary Examiner* — Phi Hoang
(74) *Attorney, Agent, or Firm* — Zilka-Kotab, P.C.

(57) ABSTRACT

One or more images (e.g., images taken from one or more cameras) may be received, where each of the one or more images may depict a two-dimensional (2D) view of a three-dimensional (3D) scene. Additionally, the one or more images may be utilized to determine a three-dimensional (3D) representation of a scene. This representation may help an entity navigate an environment represented by the 3D scene.

28 Claims, 5 Drawing Sheets

(56) References Cited

U.S. PATENT DOCUMENTS

| | | | |
|---|---|---|---|
| 2019/0279368 A1* | 9/2019 | Feng | G06T 7/11 |
| 2019/0324474 A1* | 10/2019 | Wendt | G05D 1/0242 |
| 2019/0355150 A1* | 11/2019 | Tremblay | G06N 3/0454 |
| 2020/0034351 A1* | 1/2020 | Matsugatani | G05D 1/0088 |
| 2020/0082614 A1* | 3/2020 | Xu | G01S 13/89 |
| 2020/0234488 A1* | 7/2020 | Holzer | G06T 17/00 |
| 2020/0272816 A1* | 8/2020 | Endres | G06K 9/6209 |
| 2020/0372710 A1* | 11/2020 | Wang | B33Y 50/00 |
| 2020/0380711 A1* | 12/2020 | Luo | G06T 7/55 |
| 2021/0027080 A1* | 1/2021 | Storm | G06T 7/507 |
| 2021/0183109 A1* | 6/2021 | Ch | H04N 19/597 |

OTHER PUBLICATIONS

Lin et al., "Using Synthetic Data and Deep Networks to Recognize Primitive Shapes for Object Grasping," IEEE International Conference on Robotics and Automation (ICRA), 2020, 8 pages, retrieved from https://www.semanticscholar.org/paper/Using-Synthetic-Data-and-Deep-Networks-to-Recognize-Lin-Tang/2a20b711357a7997c64916563ba02a6d598e88c8.

Tremblay et al., "Deep Object Pose Estimation for Semantic Robotic Grasping of Household Objects," 2nd Conference on Robot Learning, 2018, 11 pages, retrieved from https://arxiv.org/pdf/1809.10790.pdf.

Schonberger et al., "Structure-from-motion revisited," IEEE Conference on Computer Vision and Pattern Recognition, 2016, pp. 4104-4113, retrieved from https://openaccess.thecvf.com/content_cvpr_2016/papers/Schonberger_Structure-From-Motion_Revisited_CVPR_2016_paper.pdf.

McCormac et al., "Fusion++: Volumetric Object-Level SLAM," International Conference on 3D Vision, 2018, 10 pages, retrieved from https://www.semanticscholar.org/paper/Fusion%2B%2B%3A-Volumetric-Object-Level-SLAM-McCormac-Clark/f968c45a0da4c92e76106a16f6fbd3dce229b46a.

Mildenhall et al., "NeRF: Representing Scenes as Neural Radiance Fields for View Synthesis," European Conference on Computer Vision, 2020, 25 pages, retrieved from https://www.matthewtancik.com/nerf.

Hinterstoisser et al., "Model Based Training, Detection and Pose Estimation of Texture-Less 3D Objects in Heavily Cluttered Scenes," Asian Conference on Computer vision (ACCV), 2012, 14 pages, retrieved from https://www.semanticscholar.org/paper/Model-Based-Training%2C-Detection-and-Pose-Estimation-Hinterstoi%C3%9Fer-Lepetit/041519b9da42f85bb566803dd97a9aaa9c316909.

Peng et al., "PVNet: Pixel-wise Voting Network for 6DoF Pose Estimation," IEEE Conference on Computer Vision and Pattern Recognition, 2019, 10 pages, retrieved from https://openaccess.thecvf.com/content_CVPR_2019/papers/Peng_PVNet_Pixel-Wise_Voting_Network_for_6DoF_Pose_Estimation_CVPR_2019_paper.pdf.

Zakharov et al., "DPOD: 6D Pose Object Detector and Refiner," IEEE International Conference on Computer Vision, 2019, pp. 1941-1950, retrieved from https://openaccess.thecvf.com/content_ICCV_2019/papers/Zakharov_DPOD_6D_Pose_Object_Detector_and_Refiner_ICCV_2019_paper.pdf.

Hodan et al., "BOP: Benchmark for 6D Object Pose Estimation," 2018, European Conference on Computer Vision, 2018, pp. 1-16.

Rennie et al., "A Dataset for Improved RGBD-based Object Detection and Pose Estimation for Warehouse Pick-and-Place," IEEE Robotics and Automation Letters, 2016, pp. 1-7.

Kaskman et al., "HomebrewedDB: RGB-D Dataset for 6D Pose Estimation of 3D Objects," IEEE International Conference on Computer Vision Workshop, 2019, 10 pages, retrieved from https://openaccess.thecvf.com/content_ICCVW_2019/papers/R6D/Kaskman_HomebrewedDB_RGB-D_Dataset_for_6D_Pose_Estimation_of_3D_Objects_ICCVW_2019_paper.pdf.

Park et al., "Pix2Pose: Pixel-Wise Coordinate Regression of Objects for 6D Pose Estimation," IEEE International Conference on Computer Vision, 2019, pp. 7668-7677.

Xiang et al., "PoseCNN: A Convolutional Neural Network for 6D Object Pose Estimation in Cluttered Scenes," Robotics: Science and Systems, 2018, 10 pages, retrieved from https://arxiv.org/abs/1711.00199.

Kappler et al., "Real-time Perception meets Reactive Motion Generation," arXiv, 2017, 9 pages, retrieved from https://arxiv.org/pdf/1703.03512.pdf.

Wada et al., "MoreFusion: Multi-object Reasoning for 6D Pose Estimation from Volumetric Fusion," IEEE Conference on Computer Vision and Pattern Recognition, 2020, pp. 14540-14549.

Sucar et al., "NodeSLAM: Neural Object Descriptors for Multi-View Shape Reconstruction," arXiv, 2020, 10 pages, retrieved from https://arxiv.org/abs/2004.04485v2.

Murali et al., "6-DOF Grasping for Target-driven Object Manipulation in Clutter," IEEE International Conference on Robotics and Automation, 2020, 7 pages, retrieved from https://www.semanticscholar.org/paper/6-DOF-Grasping-for-Target-driven-Object-in-Clutter-Murali-Mousavian/c513fdc39f0a563a643e0e5c5ebfb1a1d30d161f.

Sajjan et al., "ClearGrasp: 3D Shape Estimation of Transparent Objects for Manipulation," IEEE International Conference on Robotics and Automation (ICRA), 2020, 13 pages, retrieved from https://www.semanticscholar.org/paper/Clear-Grasp%3A-3D-Shape-Estimation-of-Transparent-for-Sajjan-Moore/de19cb46e9-cf444a4fb9d80ea353ee5c8d7f86fe.

Fu et al., "Deep Ordinal Regression Network for Monocular Depth Estimation," Deep Ordinal Regression Network for Monocular Depth Estimation, 2018, pp. 2002-2011.

Collet et al., "The MOPED framework: Object recognition and pose estimation for manipulation," The International Journal of Robotics Research, Sep. 2011, 25 pages.

Schonberger et al., "Pixelwise View Selection for Unstructured Multi-View Stereo," European Conference on Computer Vision, 2016, 17 pages, retrieved from https://www.cs.unc.edu/~ezheng/resources/mvs_2016/eccv2016.pdf.

Moulon et al., "OpenMVG: Open Multiple View Geometry," Reproducible Research in Pattern Recognition, 2016, 16 pages, retrieved from https://www.semanticscholar.org/paper/OpenMVG%3A-Open-Multiple-View-Geometry-Moulon-Monasse/e8814c707e8a7068ed35c35b90c06a178a5fa93b.

Sweeney, C., "Theia Vision Library," 2016, 2 pages, retrieved from http://theia-sfm.org/.

Lhuillier et al., "A Quasi-Dense Approach to Surface Reconstruction from Uncalibrated Iages," IEEE Transactions on Pattern Analysis and Machine Intelligence, 2005, pp. 418-433.

Furukawa et al., "Accurate, Dense, and Robust Multiview Stereopsis," IEEE Transactions on Software Engineering, Aug. 2010, 9 pages.

Tola et al., "Efficient large-scale multi-view stereo for ultra high-resolution image sets," Machine Vision and Applications, May 28, 2011, 18 pages.

Yao et al., "MVSNet: Depth Inference for Unstructured Multi-view Stereo," European Conference on Computer Vision, 2018, 17 pages, retrieved from https://arxiv.org/abs/1804.02505.

Miller et al., "Automatic Grasp Planning Using Shape Primitives," IEEE International Conference on Robotics and Automation, Jan. 2003, 8 pages.

Goldfeder et al., "Grasp Planning via Decomposition Trees," IEEE International Conference on Robotics and Automation, Apr. 2007, 7 pages.

Vezzani et al., "A Grasping Approach Based on Superquadric Models," IEEE International Conference on Robotics and Automation, 2017, 8 pages, retrieved from https://www.semanticscholar.org/paper/A-grasping-approach-based-on-superquadric-models-Vezzani-Pattacini/4535bf3cdfecbad2f6e977659816d440f7e5c230.

Huebner et al., "Selection of Robot Pre-Grasps using Box-Based Shape Approximation," IEEE/RSJ International Conference on Intelligent Robots and Systems, 2008, 7 pages, retrieved from https://www.researchgate.net/publication/221066532_Selection_of_Robot_Pre-Grasps_using_Box-Based_Shape_Approximation.

Salas-Moreno et al., "SLAM++: Simultaneous Localisation and Mapping at the Level of Objects," IEEE Conference on Computer Vision and Pattern Recognition, 2013, 8 pages, retrieved from https://www.semanticscholar.org/paper/SLAM%2B%2B%3A-Simul-

(56) References Cited

OTHER PUBLICATIONS taneous-Localisation and Mapping at-of-Salas-Moreno-Newcombe/ 5c3e3c9eb353c2662333b2cafbb67bfce4baa371.

Collet et al., "Efficient Multi-View Object Recognition and Full Pose Estimation," IEEE International Conference on Robotics and Automation, May 2010, 7 pages.

Erkent et al., "Integration of Probabilistic Pose Estimates from Multiple Views," European Conference on Computer Vision, 2016, pp. 154-170.

Sock et al., "Multi-view 6D Object Pose Estimation and Camera Motion Planning using RGBD Images," IEEE International Conference on Computer Vision Workshops, 2017, pp. 2228-2235.

Li et al., "A Unified Framework for Multi-View Multi-Class Object Pose Estimation," European Conference on Computer Vision, 2018, 17 pages.

Popovic et al., "Grasping Unknown Objects using an Early Cognitive Vision System for General Scene Understanding," IEEE/RSJ International Conference on Intelligent Robotsand Systems, Sep. 2011, 10 pages.

Detry et al., "Task-oriented Grasping with Semantic and Geometric Scene Understanding," IEEE/RSJ International Conference on Intelligent Robots and Systems, 2017, 8 pages, retrieved from https:// www.semanticscholar.org/paper/Task-oriented-grasping-with-semantic-and-geometric-Detry-Papon/ 043f9bd7Oe6c9ee983928579f712af6c7bce270d.

Bohg, J., "Multi-Modal Scene Understanding for Robotic Grasping," Ph.D. Dissertation, KTH Royal Institute of Technology, 2011, 200 pages.

Chang et al., "ShapeNet: An Information-Rich 3D Model Repository," arXiv, 2015, 11 pages, retrieved from https://arxiv.org/abs/ 1512.03012.

Ester et al., "A Density-Based Algorithm for Discovering Clusters in Large Spatial Databases with Noise," Proceedings of KDD, vol. 96, 1996, pp. 226-231.

Pelleg et al., "X-means: Extending k-means with Efficient Estimation of the Number of Clusters," Proceedings of the 17th International Conference on Machine Learning, 2000, 9 pages, retrieved from http://citeseerx.ist.psu.edu/viewdoc/summary?doi=10.1.1.19. 3377.

More, J., "The levenberg-marquardt algorithm: implementation and theory," Numerical analysis, 1977, 16 pages, retrieved from https:// www.osti.gov/biblio/7256021-levenberg-marquardt-algorithm-implementation-theory.

Tremblay et al., "Indirect Object-to-Robot Pose Estimation from an External Monocular RGB Camera," IEEE/RSJ International Conference on Intelligent Robots and Systems (IROS), 2020, 8 pages, retrieved from https://www.semanticscholar.org/paper/Indirect-Object-to-Robot-Pose-Estimation-from-an-Tremblay-Tyree/ 9d25c592420c36c4493b9f10ed0a5c856cf58e8a.

Wasenmuller et al., "CoRBS: Comprehensive RGB-D Benchmark for SLAM using Kinect v2," IEEE Winter Conference on Applications of Computer Vision, 2016, 7 pages.

Zhou et al., "Open3D: A Modern Library for 3D Data Processing," arXiv, 2018, 6 pages, retrieved from https://www.semanticscholar. org/paper/Open3D%3A-A-Modern-Library-for-3D-Data-Processing-Zhou-Park/2880ac931c11176aee6d42a7e7bb0703aacde3f9.

He et al., "Mask R-CNN," IEEE International Conference on Computer Vision, 2017, pp. 2961-2969, retrieved from https:// openaccess.thecvf.com/content_ICCV_2017/papers/He_Mask_R-CNN_ICCV_2017_paperpdf.

Mitash et al., "Physics-based Scene-level Reasoning for Object Pose Estimation in Clutter," arXiv, 2019, 18 pages, retrieved from https://www.semanticscholar.org/paper/Physics-based-Scene-level-Reasoning-for-Object-Pose-Mitash-Boularias/ bd2d525ba3d5b0d72c0bd4e3506818ad4c39b59c.

Zeng et al., "Multi-view Self-supervised Deep Learning for 6D Pose Estimation in the Amazon Picking Challenge," IEEE International Conference on Robotics and Automation (ICRA), 2017, 9 pages.

Li et al., "A Robotic 3D Perception System for Operating Room Environment Awareness," arXiv, 2020, 14 pages, retrieved from https://www.semanticscholar.org/paper/A-Robotic-3D-Perception-System-for-Operating-Room-Li-Shaban/ 9ae041e52505537c7ae3a347fb6b8a0776b3855b.

Nguyen, A., "Scene Understanding for Autonomous Manipulation with Deep Learning," PhD Thesis, Nov. 2018, retrieved from https://arxiv.org/abs/1903.09761.

Montserrat et al., "Multi-View Matching Network for 6D Pose Estimation," arXiv, 2019, 4 pages, retrieved from https://arxiv.org/ abs/1911.12330.

Fhrun, S., "A Real-Time Expectation-Maximization Algorithm for Acquiring Multiplanar Maps of Indoor Environments With Mobile Robots," IEEE Transactions on Robotics and Automation, Jul. 2004, 11 pages, retrieved from https://www.researchgate.net/publication/ 3299455_A_Real-Time_Expectation-Maximization_Algorithm_for_Acquiring_Multiplanar_Maps_of_Indoor_Environments_With_Mobile_Robots.

Aleotti et al., "A 3D shape segmentation approach for robot grasping by parts," Robotics and Autonomous Systems, vol. 60, 2012, pp. 358-366.

Xia et al., "Reasonable Grasping based on Hierarchical Decomposition Models of Unknown Objects," 15th International Conference on Control, Automation, Robotics and Vision (ICARCV), Nov. 2018, pp. 1953-1958.

Knapitsch et al., "Tanks and Temples: Benchmarking Large-Scale Scene Reconstruction," Authors preprint of a SIGGRAPH 2017, 13 pages, retrieved from https://www.tanksandtemples.org/.

* cited by examiner

DETERMINING A THREE-DIMENSIONAL REPRESENTATION OF A SCENE

FIELD OF THE INVENTION

The present disclosure relates to performing image analysis.

BACKGROUND

Scene awareness, or scene understanding, is important for an entity (such as a robotic manipulator, a vehicle, etc.) to effectively interact with an environment. The entity must know where surfaces are located in the scene to perform obstacle avoidance, and may also desire to know what objects are in the scene for potential interaction (such as manipulation). However, existing deployed entities (such as robotic manipulators) have limited, if any, perception of their surroundings.

DETAILED DESCRIPTION

One or more images (e.g., images taken from one or more cameras) may be received, where each of the one or more images may depict a two-dimensional (2D) view of a three-dimensional (3D) scene. Additionally, the one or more images may be utilized to determine a three-dimensional (3D) representation of a scene. This representation may help an entity navigate an environment represented by the 3D scene.

Figure 1:
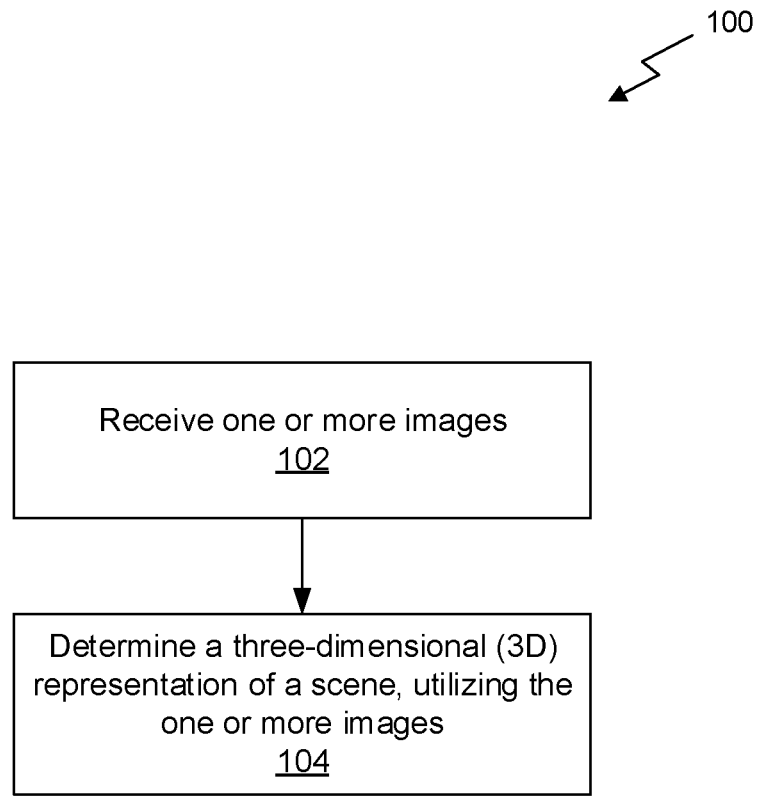
FIG. 1 illustrates a flowchart of a method for determining a three-dimensional representation of a scene, in accordance with an embodiment.

FIG. 1 illustrates a flowchart of a method 100 for determining a three-dimensional representation of a scene, in accordance with an embodiment. The method 100 may be performed the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

As shown in operation 102, one or more images are received. In one embodiment, the one or more images may be captured utilizing one or more cameras (e.g., one or more video cameras, one or more still image cameras, etc.) mounted on or separately from an entity. For example, the one or more cameras may include one or more red/green/blue (RGB) cameras (e.g., cameras including one or more sensors for capturing color images), one or more red/green/blue/depth RGBD cameras (e.g., cameras including one or more sensors for capturing color images as well as one or more sensors for capturing depth information), one or more black and white cameras, etc.

Additionally, in one embodiment, the one or more images may each include a video frame of a video stream obtained from one or more video cameras. In another embodiment, the one or more images may include one or more still images obtained from one or more still image cameras. In yet another embodiment, the one or more cameras may be mounted on an entity.

For example, the entity may include a manipulator (e.g., a mechanical device such as a robot arm that is able to interact with its environment). In another example, the entity may include a vehicle (e.g., a car, drone, plane, boat, etc.).

Further, in one embodiment, the one or more cameras may be mounted separately from an entity. In another embodiment, each of the one or more images may include a picture of a scene (e.g., an image of an environment in which the entity is located, etc.). For example, all or a portion of the entity may be included in the images. In yet another embodiment, each of the one or more images may depict a two-dimensional (2D) view of a three-dimensional (3D) scene.

Further still, as shown in operation 104, a three-dimensional (3D) representation of a scene is determined utilizing the one or more images. In one embodiment, determining the 3D representation of the scene may include calculating a 3D reconstruction of the scene. For example, a camera pose/location for each of the one or more images may be determined by analyzing the image (e.g., to identify an angle of view, a viewpoint location, etc.).

Also, in one embodiment, a camera pose for each of the one or more images may be determined utilizing camera location data (e.g., location data retrieved from one or more calibrated mechanisms on which a camera is mounted, etc.). In another embodiment, the one or more images and their associated camera poses/locations may be input to a neural network that outputs a 3D reconstruction of the scene.

In addition, in one embodiment, the 3D reconstruction of the scene may include a point cloud (e.g., a set of data points in 3D space) or point mesh. In another embodiment, the neural network may perform one or more of structure from motion and multi-view stereo operations utilizing the one or more images and their associated camera poses/locations. In yet another embodiment, the 3D reconstruction of the scene may be used by the entity to avoid one or more obstacles within the environment in which the entity is located.

Furthermore, in one embodiment, determining the 3D representation of the scene may include performing primitive shape segmentation within the scene. In another embodiment, for each of the one or more images, the 3D reconstruction of each scene for the image may be used to render a virtual depth image for the scene. For example, a point cloud calculated for an image may be denoised and projected onto the image plane to create a virtual depth map for the image. In another example, the virtual depth map may be saved with its associated image.

In this way, depth information may be obtained for each of the one or more images. This depth information may also be obtained directly from an RGBD camera (without performing rendering actions).

Further still, in one embodiment, each of the one or more images and its associated virtual depth map may be input into a neural network. In another embodiment, the neural network may classify pixels within each of the one or more images according to a plurality of predetermined categories. For example, the plurality of predetermined categories may include predetermined 3D primitives/shapes (e.g., cylinders, cuboids, etc.).

In this way, the neural network may determine specific primitives for objects within the scene, which may result in a category-level understanding of the scene.

Also, in one embodiment, results (e.g., identified primitives/shapes) may be determined for images of a scene taken from different camera angles. For example, these different camera angles may be obtained by moving a single camera or obtaining images of the scene from multiple different cameras. In another embodiment, these results may be integrated (e.g., utilizing a multi-view voting process) to increase a quality/certainty of the results for the scene.

Additionally, in one embodiment, determining the 3D representation of the scene may include fitting 3D models to objects within the scene. For example, for each of one or more objects within the scene, shape fitting may be run to determine a specific model for the object and to fit the specific model to the object. In another embodiment, for each identified primitive, a plurality of predetermined parametric models may be compared to the primitive to identify a parametric model that matches the primitive.

Further, in one embodiment, a 3D model library may be cross-referenced with each identified primitive to determine an associated 3D model for the primitive. In another embodiment, each matching parametric model may be adjusted, resized, etc. to fit the dimensions of the identified primitive within the image.

Further still, in one embodiment, determining the 3D representation of the scene may include performing object pose estimation for one or more objects within the scene. For example, a neural network may first be trained using a set of specific known objects to identify any instances of those known objects within an image, as well as a pose of the known objects within the image. In another embodiment, each of the one or more images may be input, along with a set of specific known objects, into the trained neural network.

Also, in one embodiment, the trained neural network may output, for each of the one or more images, an identification of any instances of those known objects within the image, as well as a pose (e.g., translation and rotation) of the known objects within the image. In another embodiment, object pose estimation may be performed on a series of images taken at different camera positions/viewpoints of the scene to refine the instance identification/pose estimation. In yet another embodiment, results of object pose estimation for an image may be combined with a determined camera pose/location for the image to determine a location of one or more objects within the scene illustrated by the image.

In addition, in one embodiment, the 3D representation of the scene may be used by the entity to navigate an environment illustrated by the scene. For example, the entity may include an articulated arm that maneuvers through the environment to perform one or more duties (e.g., physical object selection/manipulation, etc.). In another example, the entity may include an automated driving vehicle that maneuvers through the environment utilizing the 3D representation of the scene.

In this way, the entity may obtain an improved understanding of its environment via the 3D representation of the scene. This may improve a navigation performance of the entity as it interacts with the environment illustrated by the scene.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
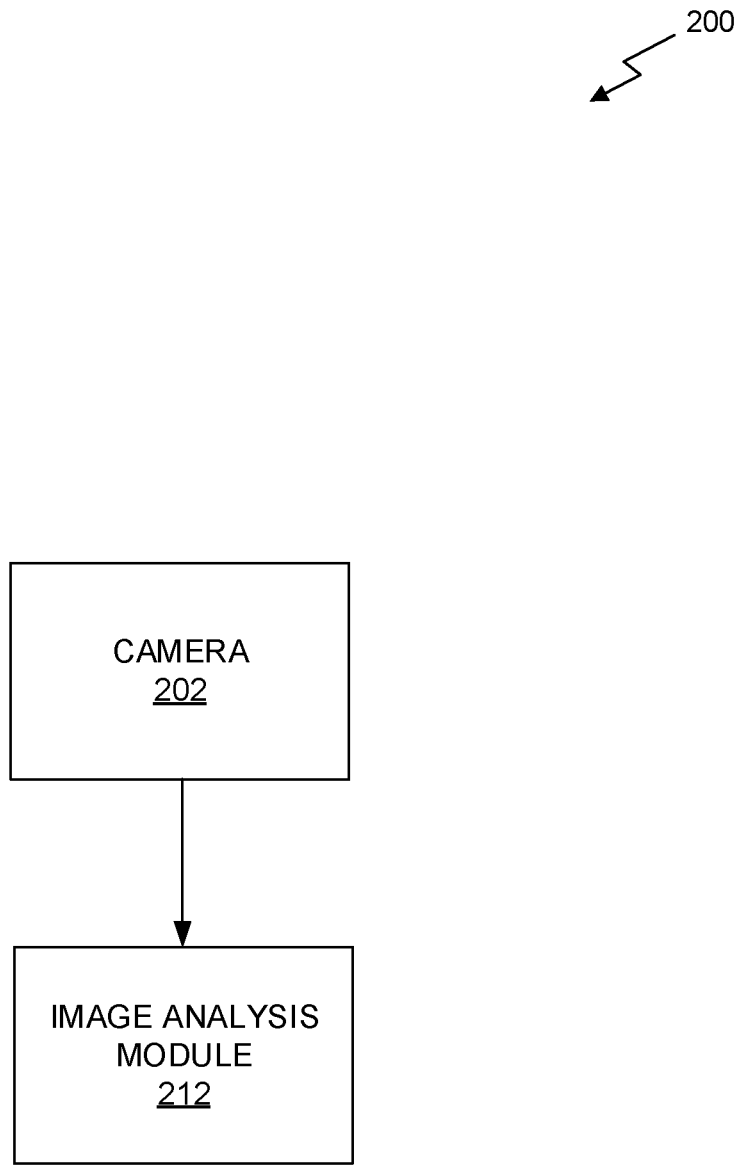
FIG. 2 illustrates an exemplary 3D scene understanding environment, in accordance with an embodiment.

FIG. 2 illustrates an exemplary 3D scene understanding environment 200, according to one exemplary embodiment. As shown, a camera captures one or more images and sends the captured images to an image analysis module 204. In one embodiment, the images may include images of an environment in which an entity is located. In another embodiment, the camera 202 may be mounted on a portion of the entity. In yet another embodiment, the camera 202 may be mounted separately from the entity. Although a single camera 202 is shown, multiple cameras may capture and return image data to the image analysis module 204.

Additionally, in one embodiment, the captured images may be sent from the camera 202 to the image analysis module 204 via one or more of a wired communications connection (e.g., a wired communications network, etc.) and a wireless communications connection (e.g., a wireless network, a cellular network, etc.). In another embodiment, the image analysis module 204 may be located on or within the entity. In yet another embodiment, one or more portions of the image analysis module 204 may be located remotely from the entity and camera 202 (e.g., within a cloud-based computing environment, etc.).

Further, in one embodiment, the image analysis module 204 may determine a 3D representation of a scene, utilizing the one or more images. In another embodiment, the scene may include an image-based representation of an environment in which the entity is located. In yet another embodiment, the image analysis module 204 may provide the 3D representation of the scene to the entity.

In this way, the entity may utilize the 3D representation of the scene to navigate the environment illustrated by the 3D representation of the scene.

Figure 3:
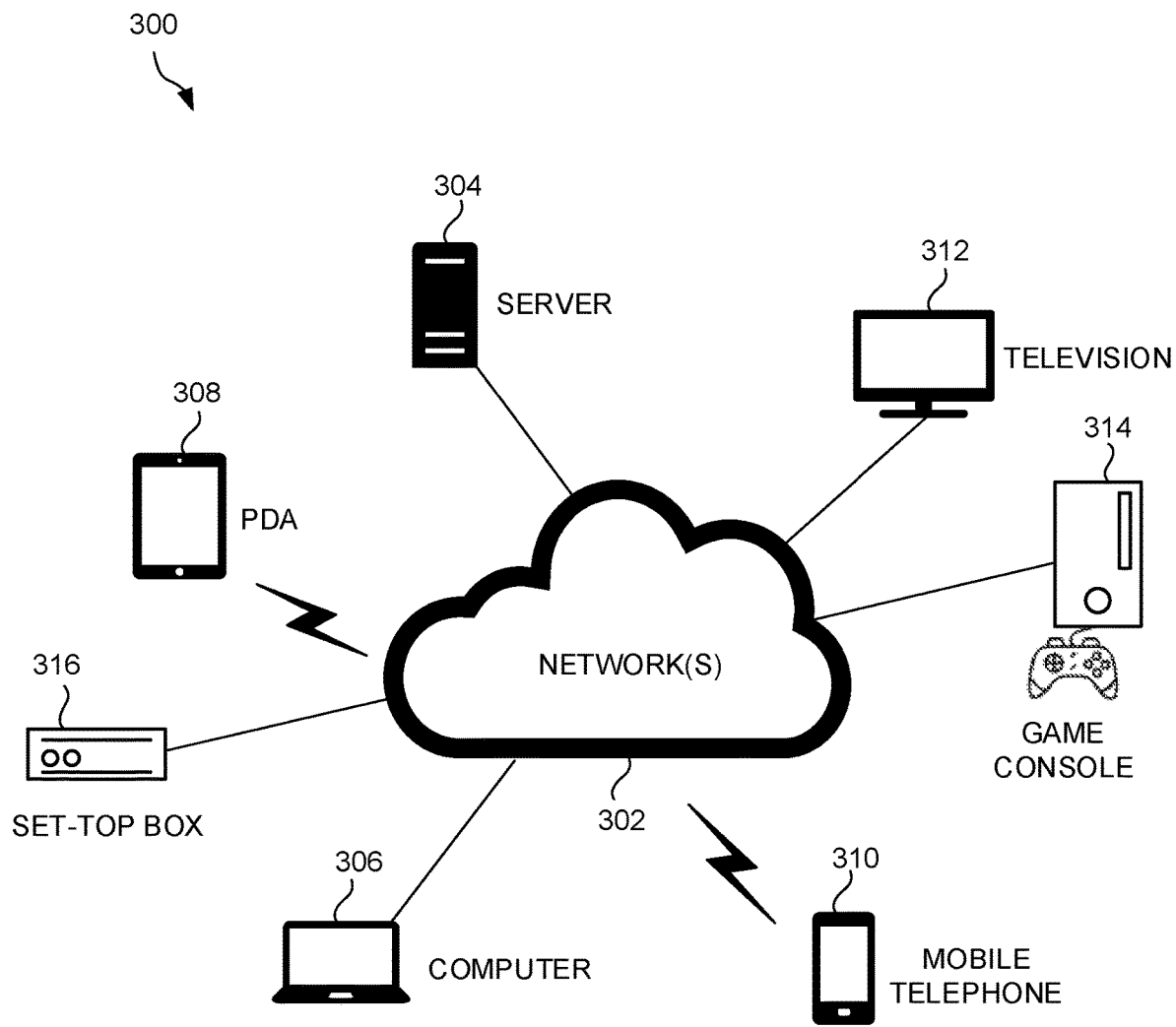
FIG. 3 illustrates a network architecture, in accordance with an embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, a game console 314, a television set-top box 316, etc.

Figure 4:
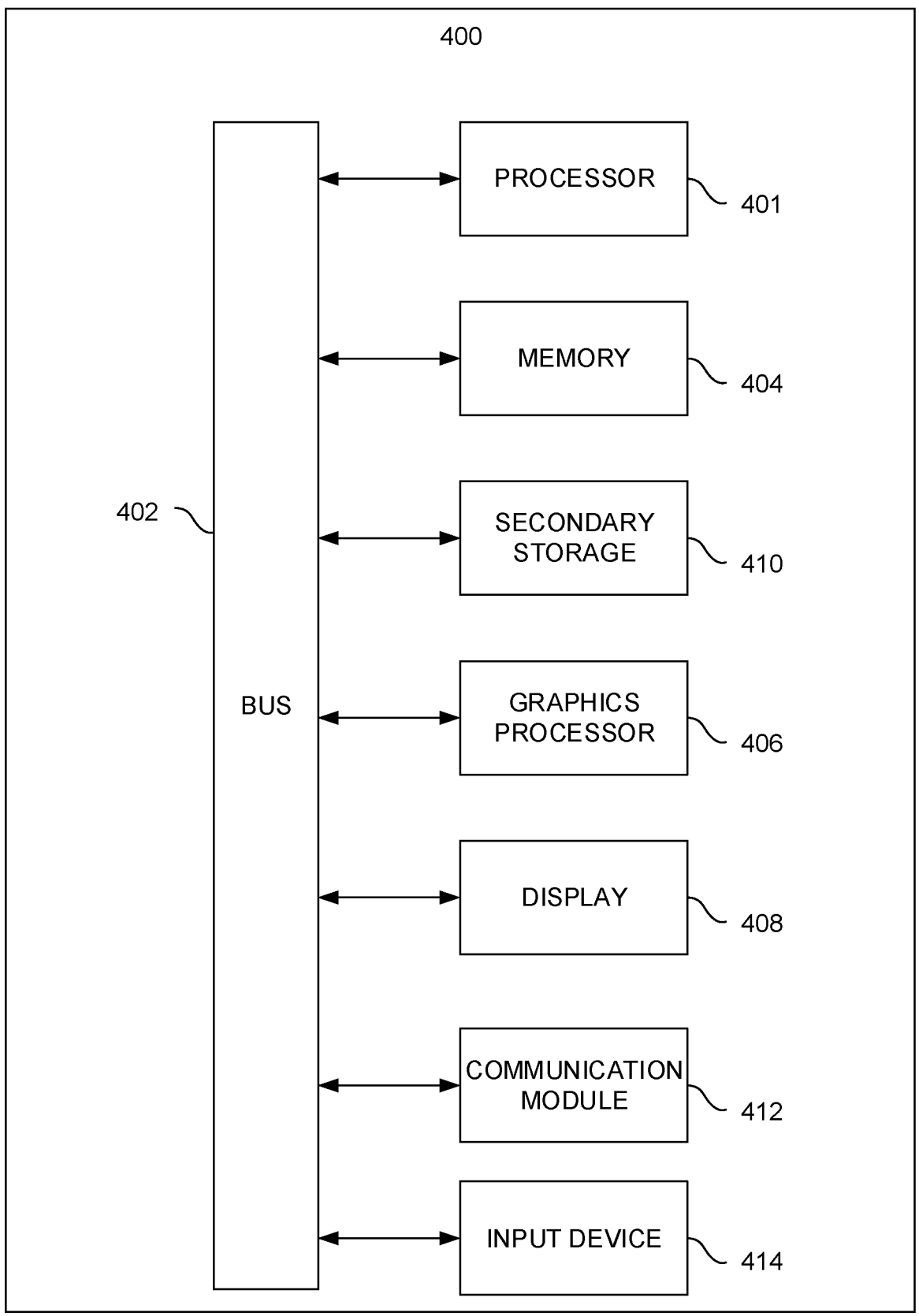
FIG. 4 illustrates an exemplary system, in accordance with an embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As also shown, the system 400 may include one or more input devices 414. The input devices 414 may be wired or wireless input device. In various embodiments, each input device 414 may include a keyboard, touch pad, touch screen, game controller (e.g. to a game console), remote controller (e.g. to a set-top box or television), or any other device capable of being used by a user to provide input to the system 400.

Multi-View Fusion for Multi-level Robotic Scene Understanding

Scene awareness, or scene understanding, is important for a robotic manipulator to interact with an environment. A robot must know both where surfaces are located in the scene, for obstacle avoidance, as well as what objects are in the scene for grasping and manipulation. Some objects may be known to the robot and relevant to the task at hand, while others may only be recognizable by their general category or affordance properties. Existing deployed robotic manipulators have limited, if any, perception of their surroundings.

To overcome this limitation, a robotic manipulator may be provided with three levels of understanding:

(1) Generic Surfaces

As the robot moves within the workcell, it is important to avoid unintended collisions to maintain safe operation. Therefore, the robot must be aware of rigid surfaces nearby, and whether or not they are manipulable.

(2) Known Categories/Affordances

Some of these surfaces may be objects that are manipulable. For many such objects it may be sufficient to simply recognize the category to which the object belongs, or some affordance properties. For example, objects may be found whose shape is roughly cylindrical or cuboidal.

(3) Known Objects

Some of these objects may be known beforehand. For example, oftentimes a robot is deployed in a workcell to interact with a small set of known objects for a specific task. For such objects it may be possible to infer their full 6-DoF poses for rich manipulation.

A system may be provided that integrates these three levels of understanding. Unlike existing approaches to integrating object-level perception and robotic manipulation, which rely on depth sensing, the system disclosed herein may rely on RGB images as input. In the case of a static scene, multi-view RGB images may carry the same information used by depth sensors (i.e., triangulation from correpondences, etc.), yet they generally operate at much higher resolution and therefore yield potentially more scene information.

Moreover, RGB is often needed to correct errors in depth measurements, like those due to transparent surfaces.

An exemplary system scans a scene using an RGB eye-in-hand camera, and processes the image sequence to generate a multilevel representation of the scene. Specifically, the system consists of three components:

1) dense 3D reconstruction using COLMAP and CasMVSNet, with a novel postprocessing step to yield high-quality depth maps;

2) an improved primitive shapes network trained to operate on RGB-derived depth maps and extended to integrate multiview segmentation results, as well as to fit solid parametric models; and 3) a multi-view extension of the single-view object pose estimator DOPE.

In one embodiment, the following features are included:

Multi-level scene understanding for robotic manipulation. This includes 3D dense reconstruction for obstacle avoidance, shape estimation and fitting of objects with primitive shapes, and full 6-DoF pose estimation of known object instances.

Multi-view extensions to primitive shape fitting and object pose estimation, and an extension of the former to consume virtual depth maps from RGB-based reconstruction.

Figure 5:
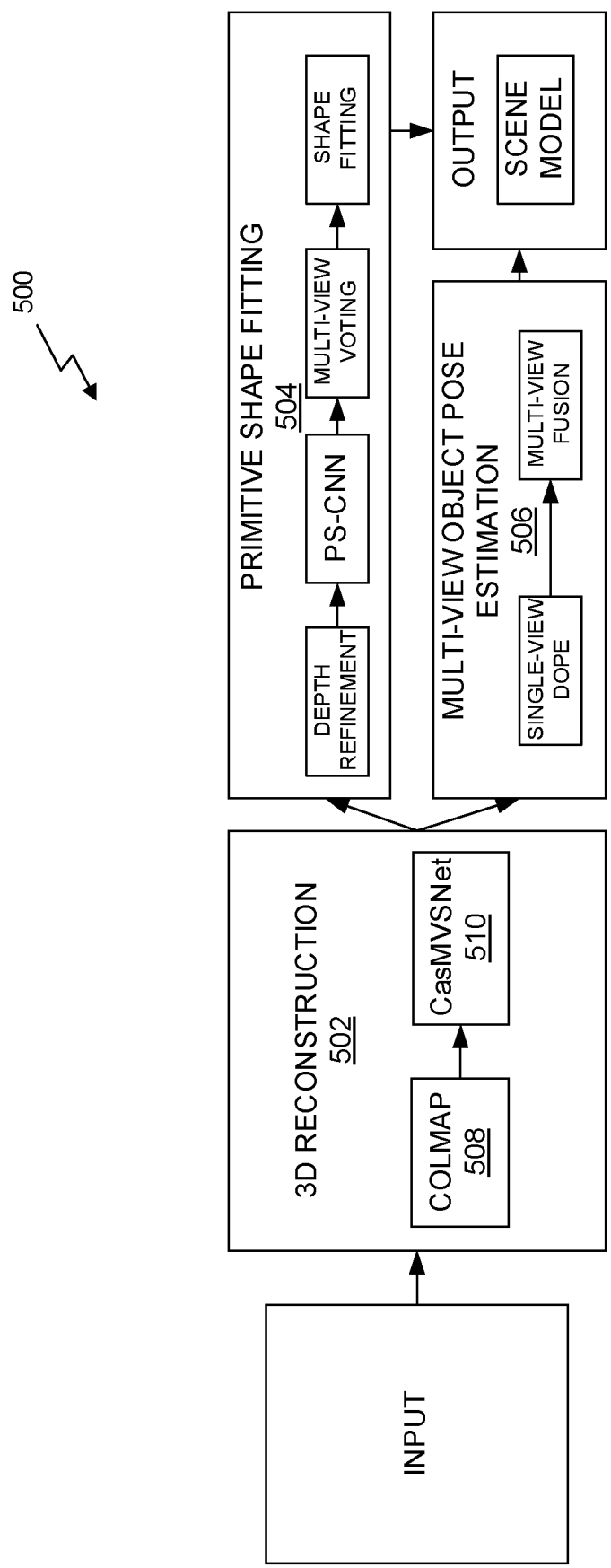
FIG. 5 illustrates an exemplary two-step process that invokes COLMAP to refine camera poses obtained from a robot, in accordance with an embodiment.

In one embodiment, an exemplary system leverages three modules to produce three different levels of representation for robotic manipulation. It may assume that a camera mounted on a robot arm captures multiple views of a scene and registers the camera pose at each capture. FIG. 5 describes the general workflow 500: 3D reconstruction 502, primitive shape fitting 504, and 6-DoF pose estimation of known objects 506.

Multi-View Stereo for 3D Dense Reconstruction

Dense 3D scene reconstruction may be needed for obstacle avoidance and as input to other modules. A two-step process may be used that invokes COLMAP 508 to refine the camera poses obtained from the robot, as shown in FIG. 5. This helps to decrease the camera pose errors caused by robot forward kinematic discrepancies, synchronization issues, etc. Given COLMAP refined camera poses, the second step relies on CasMVSNet 510, a deep-learning-based multi-view stereo method, to provide a dense, colored 3D point cloud. This multi-view stereo method leverages a feature pyramid geometric encoding that uses coarse-to-fine processing.

Multi-View Primitive Shape Segmentation and Fitting

Given the point cloud output from the previous process, all the possible graspable objects may be determined through a shape completion algorithm. For a PS-CNN method may be used, which decomposes common household objects into one or more primitive shapes for grasping, using a single depth image.

Depth Refinement

PS-CNN expects a high-quality depth images from a depth sensor, and one exemplary system utilizes virtual depth images rendered from the reconstructed point cloud. To remove undesirable artifacts, the resulting point cloud may be denoised, and RANSAC may be applied to identify tabletop plane parameters, after which double thresholding removes and replaces the tabletop points without affecting the objects on the table. The resulting point cloud is projected onto the image plane to yield a virtual depth map, with region connectivity-based denoising, temporal averaging, and spatial median filtering. Finally, the virtual tabletop plane is re-introduced to fill the missing pixels.

Data Generation

In one embodiment, more realistic synthetic training data may be used to train the PS-CNN in order to improve its performance. Various parameterized primitive shapes may be placed onto a virtual table imported from ShapeNet, using domain randomization to vary object pose, primitive shape parameter, density of placement, background diversity, camera view, etc.

Multi-View Voting

Segmentations from the newly trained network applied to multiple views may be integrated. The segmentations are unprojected to 3D and voxelized, whereupon a voting process determines the voxel labels. Next, point clouds corresponding to the mask instances in each view with a significant overlap to each other are combined. After each aggregation operation, DBSCAN provides denoising, along with non-maximal suppression to remove the redundant predictions according to size. A final RANSAC-based process fits each segmented region to a parameterized primitive shape (e.g., cylinder or cuboid) to recover a solid model representation.

Multi-View Object Pose Fusion

To retrieve the 6-DoF pose of known objects, the DOPE method may be extended to a multi-view scenario, to yield MV-DOPE. DOPE may be run on image frames captured by the robot, using a voting mechanism to merge the predictions. More specifically, for each object class a set $\{T_i\}_{i=1}^{m}$ of 6-DoF poses are obtained in a common world coordinate system. For each object pose $T_i=[R_i|t_i]\in SE(3)$ confidence score $w_i^j \in \mathbb{R}$ is associated with each of the n keypoints, from which the average score $$w_i^{avg} = \frac{1}{n}\sum_{j=1}^{n} = w_i^j$$

is computed. Based on the assumption that a good instance candidate should have stable keypoint locations, perspective-n-point (PnP) is applied to different subsets of the keypoints to get multiple pose predictions for each detection. The consistency of the projected keypoints from these poses are then used to calculate $w_i^{pnp}$. Object pose candidates are filtered according to their confidence score and Euclidean distance to different predictions. Candidate poses are then sampled around the detected rotations $R_i$ using a Gaussian, while keeping the positions $t_i$ fixed. This generates a set $\mathcal{T}$ of candidate poses. The best candidate is found by minimizing the sum of weighted reprojection errors of the keypoints across all candidates:

$$T^* = \underset{T \in \mathcal{T}}{\operatorname{argmin}} \sum_{i=1}^{m} \sum_{j=1}^{n} \tilde{w}_i^j [proj(Tk^j) - proj(T_i k^j)]^2, \quad (1)$$

where proj represents the projection operation, $k^j \in \mathbb{R}^3$ represents the jth keypoint on the object model, and $\tilde{w}_i^j = w_i^{pnp} w_i^{avg} w_i^j$.

Finally, the weights are updated by comparing the detected rotations, after clustering via X-means, to those of the best candidate: $\tilde{w}_i^j = w_i^{resample} w_i^{pnp} w_i^{avg} w_i^j$, where $w_i^{resample}$ is high when the rotation of the mean of the cluster is similar to $R^*$. These candidates are then augmented with candidate poses that are sampled around the best position $t^*$ and rotation $R^*$ using a Gaussian with large variance to yield a new set $\mathcal{T}$. Eq. (1) is applied again with these new values to update $T^*$, followed by Levenberg-Marquardt to refine the best pose.

A multi-level representation for robotic manipulation using multi-view RGB images is provided. Using a 3D scene reconstruction technique, a dense point cloud is provided, which is useful for obstacle avoidance. Using this dense representation, primitive shape estimation and fitting are applied to the multi-view case. A multi-view approach is also provided to estimate the pose of known objects with improved accuracy over single-view estimation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
receiving one or more images; and
processing the one or more images, using at least one neural network, to determine a three-dimensional (3D) representation of a scene by:
processing, by the at least one neural network, camera location data in combination with the one or more images to provide a point cloud or point mesh,
processing, by the at least one neural network, the point cloud or point mesh in combination with the one or more images to determine primitives for objects within the scene, and
fitting 3D models to the objects within the scene, based on the primitives determined for the objects within the scene.

2. The method of claim 1, wherein the one or more images are captured utilizing one or more cameras mounted on or separately from an entity.

3. The method of claim 1, wherein each of the one or more images depicts a two-dimensional (2D) view of the scene.

4. The method of claim 1, wherein determining the 3D representation of the scene includes calculating a 3D reconstruction of the scene.

5. The method of claim 4, wherein the 3D reconstruction of the scene includes the point cloud or point mesh.

6. The method of claim 1, further comprising determining a camera pose for each of the one or more images.

7. The method of claim 1, wherein determining the 3D representation of the scene includes performing primitive shape segmentation within the scene which includes determining the primitives for the objects within the scene.

8. The method of claim 1, wherein for each of the one or more images, a 3D reconstruction of each scene for the image is used to render a virtual depth image for the scene.

9. The method of claim 1, wherein determining the 3D representation of the scene further includes performing object pose estimation for the objects within the scene.

10. The method of claim 1, further comprising utilizing the 3D representation of the scene to navigate an environment illustrated by the scene.

11. The method of claim 1, wherein processing the one or more images, using the at least one neural network, includes:
processing, by a first neural network of the at least one neural network, the camera location data in combination with the one or more images to provide the point cloud or point mesh.

12. The method of claim 11, wherein the one or more images are processed using a plurality of neural networks, and wherein processing the one or more images, using the plurality of neural networks, includes:
processing, by a second neural network of the plurality of neural networks, the point cloud or point mesh in combination with the one or more images to determine the primitives for the objects within the scene.

13. The method of claim 12, wherein fitting 3D models to the objects within the scene includes:
for each of the primitives, comparing a plurality of predetermined parametric models to the primitive to identify a parametric model of the plurality of predetermined parametric models that matches the primitive.

14. The method of claim 13, wherein the parametric model that matches the primitive is adjusted to fit dimensions of the primitive.

15. The method of claim 13, wherein processing the one or more images, using the plurality of neural networks, includes:
processing, by a third neural network of the plurality of neural networks, a set of known objects in combination with the one or more images to identify one or more instances of the known objects within the one or more images, and a pose of the one or more instances of the known objects identified within the one or more images.

16. The method of claim 15, wherein the one or more instances of the known objects identified within the one or more images and the pose of the one or more instances of the known objects identified within the one or more images are used in combination with the camera location data to determine a location of the one or more instances of the known objects within the scene.

17. The method of claim 1, wherein the 3D representation of the scene is utilized for robotic manipulation including:
identification of rigid surfaces within the scene for obstacle avoidance.

18. The method of claim 1, wherein the 3D representation of the scene is utilized for robotic manipulation including:
identification of instances of known objects within the scene for physical object grasping and manipulation.

19. A system comprising:
a processor that is configured to:
receive one or more images; and
processing the one or more images, using at least one neural network, to determine a three-dimensional (3D) representation of a scene by:
processing, by the at least one neural network, camera location data in combination with the one or more images to provide a point cloud or point mesh,
processing, by the at least one neural network, the point cloud or point mesh in combination with the one or more images to determine primitives for objects within the scene, and
fitting 3D models to the objects within the scene, based on the primitives determined for the objects within the scene.

20. The system of claim 19, wherein the one or more images are captured utilizing one or more cameras mounted on or separately from an entity.

21. The system of claim 19, wherein each of the one or more images depicts a two-dimensional (2D) view of the scene.

22. The system of claim 19, wherein determining the 3D representation of the scene includes calculating a 3D reconstruction of the scene.

23. The system of claim 22, wherein the 3D reconstruction of the scene includes the point cloud or point mesh.

24. The system of claim 19, further comprising determining a camera pose for each of the one or more images.

25. The system of claim 19, wherein determining the 3D representation of the scene includes performing primitive shape segmentation within the scene which includes determining the primitives for the objects within the scene.

26. A non-transitory computer-readable media storing computer instructions which when executed by one or more processors cause the one or more processors to perform a method comprising:
receiving one or more images; and
processing the one or more images, using a neural network, to determine a three-dimensional (3D) representation of a scene by:
processing, by the at least one neural network, camera location data in combination with the one or more images to provide a point cloud or point mesh, processing, by the at least one neural network, the point cloud or point mesh in combination with the one or more images to determine primitives for objects within the scene, and fitting 3D models to the objects within the scene, based on the primitives determined for the objects within the scene.

27. The non-transitory computer-readable media of claim 26, wherein the one or more images are received from one or more cameras, where the one or more cameras are mounted on or separately from an entity.

28. A method, comprising:

receiving at an entity one or more images captured utilizing one or more cameras mounted on or separately from the entity;

processing the one or more images, using at least one neural network, to determine a three-dimensional (3D) representation of a scene, including:

calculating, using the at least one neural network, a 3D reconstruction of the scene that includes a point cloud or point mesh, performing primitive shape segmentation within the scene including processing, by the at least one neural network, the point cloud or point mesh in combination with the one or more images to determine primitives for objects within the scene, fitting 3D models to the objects within the scene, based on the primitives determined for the objects within the scene, and performing object pose estimation for one or more objects within the scene; and utilizing the 3D representation of the scene by the entity to navigate an environment illustrated by the scene.

* * * * *